US007426743B2

(12) United States Patent
Lee et al.

(10) Patent No.: US 7,426,743 B2
(45) Date of Patent: Sep. 16, 2008

(54) SECURE AND PRIVATE ISCSI CAMERA NETWORK

(75) Inventors: Kuo Chu Lee, Princeton Junction, NJ (US); Lipin Liu, Belle Mead, NJ (US); Hasan Timucin Ozdemir, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 635 days.

(21) Appl. No.: 11/058,557

(22) Filed: Feb. 15, 2005

(65) Prior Publication Data

US 2006/0181612 A1 Aug. 17, 2006

(51) Int. Cl.
*H04N 7/173* (2006.01)
*H04N 5/225* (2006.01)
*H04N 5/232* (2006.01)

(52) U.S. Cl. .................. 725/105; 348/211.3; 348/207.1

(58) Field of Classification Search ............... 348/207.1, 348/207.11, 211.1, 211.3; 725/105
See application file for complete search history.

(56) References Cited

U.S. PATENT DOCUMENTS

| 6,925,533 | B2* | 8/2005 | Lewis .......................... 711/118 |
| 7,249,173 | B2* | 7/2007 | Nicolson ..................... 709/223 |
| 2002/0199205 | A1* | 12/2002 | Sonawane et al. ........... 725/115 |
| 2003/0182455 | A1* | 9/2003 | Hetzler et al. ............... 709/250 |
| 2004/0006587 | A1* | 1/2004 | McConnell et al. ......... 709/202 |
| 2004/0062267 | A1* | 4/2004 | Minami et al. .............. 370/463 |
| 2004/0196375 | A1* | 10/2004 | Marshall .................. 348/207.1 |
| 2005/0188060 | A1* | 8/2005 | Meneghini et al. .......... 709/220 |
| 2005/0240678 | A1* | 10/2005 | Hufferd et al. .............. 709/246 |
| 2006/0013162 | A1* | 1/2006 | Lim ........................... 370/328 |
| 2006/0182102 | A1* | 8/2006 | Lee et al. .................... 370/389 |
| 2007/0250883 | A1* | 10/2007 | Busch et al. ................ 725/105 |

OTHER PUBLICATIONS

Landon, Bill; "Pyx Technologies, Inc. Introduces the World's First iSCSI Thin Client Initiator for the Storage Mark"; <http://www.pdatoday.com/index.php/weblog/comments/pyx_technologies_inc_introduces_the_worlds_first_iscsi_thin_client_initiato/>.*
Bosch Press Release; "Bosch Defines Second Generation IP CCTV with New iSCSI 16-Channel Encoder"; <www.boschsecurity.us/pdfs/BOS-A-3209.VIPX1600.rtf>.*
Bosch Technical Brief; "iSCSI Technical Brief"; <www.boschsecurity.us/pdf/EN/iscsi%20Technical%20Brief%20hi_res.pdf>.*
Saran et al, RFC 3720: "Internet Small Computer System Interface", The Internet Society, Apr. 2004.

* cited by examiner

*Primary Examiner*—John M Villecco
(74) *Attorney, Agent, or Firm*—Harness, Dickey & Pierce, PLC

(57) ABSTRACT

A peer-to-peer camera sensor network is defined using intelligent cameras that employ iSCSI initiators and iSCSI targets to read and write data and to send control commands directly across the network as iSCSI blocks. Because data transfer rides on top of the internet protocol, cameras can be directly attached to the internet without requiring attachment to a host computer. Image data represented as video frames are mapped onto iSCSI data blocks and are shared among the cameras directly to form an efficient virtual block level video image frame storage that can be directly manipulated by multiple cameras without data replications. Transport of multiple streams, associated with scalable or multilevel MPEG encoding scheme for instance, are automatically sequenced and realigned as the iSCSI data blocks are time-aligned.

38 Claims, 3 Drawing Sheets

SECURE AND PRIVATE ISCSI CAMERA NETWORK

BACKGROUND OF THE INVENTION

The present invention relates generally to security cameras, including web cameras, and audio-video capture systems. More particularly, the invention relates to a networked camera system employing iSCSI target and initiator technology to allow the storage device to be located anywhere on the network, with frame buffers of the media player being mapped into iSCSI data blocks so that the frame buffer can be controlled directly from the camera.

With current security cameras, such as those used in surveillance systems and in internet-based web cam systems, the camera interface has proven to be a weak point. One common interface employs a USB (universal serial bus) connection between the camera and a host PC, with the PC then providing the connection to an IP (internet protocol) network. Another common interface employs an Ethernet connection between the camera and the host PC. In this embodiment the camera is provided with an Ethernet port capable of connection to an IP network using the TCP/IP protocol.

Such TCP/IP cameras come in two varieties, a hard wired variety designed to connect using Ethernet cabling and a wireless variety that uses a wireless communication technology such as 802.11x (WiFi). While somewhat more convenient than the USB-connected counterpart, these TCP/IP cameras are subject to possible attack. Each http port in the camera is open for attack from the internet or from a local intranet. Moreover, conventional cameras cannot directly write the captured image and video data to a remote disk. As a result, additional communication software needs to be developed to deliver the data to a remote site and then store that data onto suitable storage devices. Even when the camera is provided with local storage, such as flash memory or microdisks, the camera still requires some access interface to support remote access to these files.

SUMMARY OF THE INVENTION

The present invention addresses the foregoing shortcomings of existing camera interfaces by using the iSCSI protocol to model the camera, thereby allowing the iSCSI-enabled camera to support remote access to captured image frames as if it were a sequence of data blocks on the storage device.

Thus, according to one aspect of the invention a camera is provided for connection to a network. The camera includes a camera device for converting optical information into electronic image data, processing modules to convert data into multiple layers of encoded data frames, and a data transfer module coupled to the multilevel encoded data and a temporary pre-recording module to receive data to be transferred to external storage over the network. The data transfer module is configured to comply with the iSCSI protocol and adapted to communicate said layered multi-level image frame data over said network as a plurality of iSCSI data blocks.

In another aspect, a networked camera system is provided whereby a plurality of camera devices are each adapted for converting optical information into electronic image data. The plurality of camera devices each have a data transfer module coupled to receive electronic image data. The data transfer module is configured to comply with the iSCSI protocol and adapted to communicate said image data over the network as a plurality of iSCSI data blocks. The plurality of camera devices are then coupled for communication with each other over the network by sending iSCSI data blocks to achieve highly efficient frame by frame processing among multiple cameras using efficient iSCSI block by block transfer protocols.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. As more fully discussed herein, the camera system utilizes the iSCSI protocol (employing iSCSI initiator and target components) to particular advantage. The iSCSI protocol is a standard defined by a working group under the governance of the Internet Society. Those skilled in the art will understand that the iSCSI protocol may be adapted and revised from time to time. Accordingly, the terminology "iSCSI protocol" as used herein shall mean a protocol for sending SCSI commands and for reading and writing SCSI data over a network using TCP/IP protocols. Modifications to the iSCSI protocol are expected from time to time and are considered to be within the scope of the invention as set forth in the appended claims.

Figure 1:
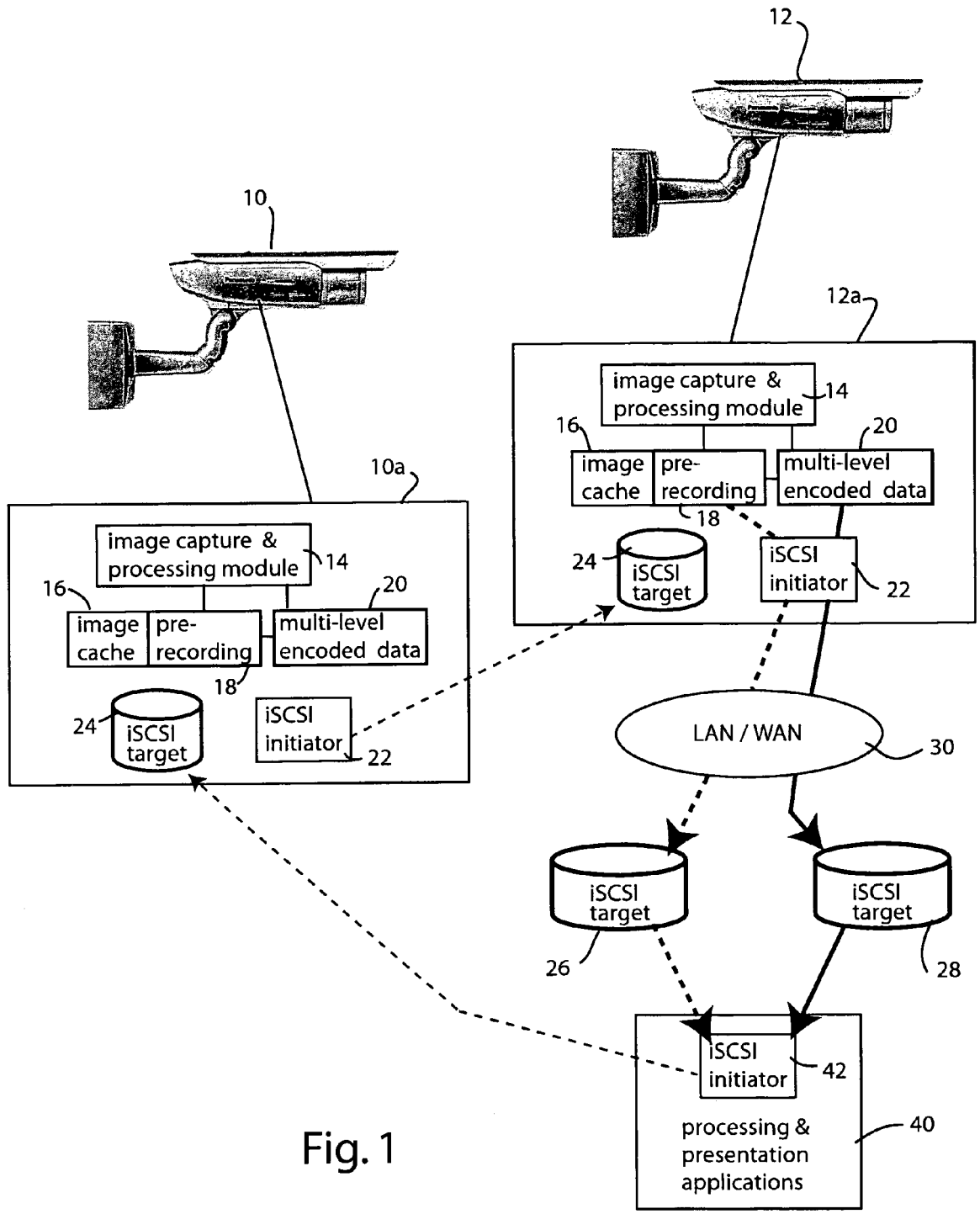
FIG. 1 is a block diagram of the iSCSI camera architecture, shown in conjunction with other iSCSI target and initiator devices coupled through a network.

Referring to FIG. 1, exemplary cameras in accordance with a presently preferred embodiment of the invention are illustrated at 10 and 12. Block diagrams of the internal components of the respective cameras 10 and 12 have been illustrated at 10a and 12a in FIG. 1. The illustrated embodiment represents an advanced new camera system that includes a full complement of image capture and processing functions, performed by the image capture and processing module 14 (also referred to as the image processing unit), an image cache 16 with associated prerecording module 18, and a multi-level encoding module 20 that supplies multi-level (also referred to as multi-layer) encoded data. The layering of the encoding is arbitrary done by different implementations. Here we refer multi-layer based on the degree of resolution of regions of image in the whole image frame, selecting a set set of frames, as well as some semantic based image frame compression and filtering schemes. The image cache 16 and pre-recording 18 modules can be used, together with image caches and pre-recording modules of other cameras and with other network-attached storage devices to define a virtual storage system accessible at a low level block by block basis to achieve maximal performance and access flexibility.

The image processing unit functions in conjunction with the image cache and virtual storage system, based on the iSCSI client and target pair, to allow the camera to become an intelligent processing unit that can interact with other intelligent cameras through the shared virtual storage interface. The data sharing is efficient because the data can be retrieved on demand from each camera's processing logic. Not all the images collected by the camera must be sent in real time to the storage system. The camera can map the local disk to a large virtual storage network, so that an application can retrieve the image, or ask a camera to encode the image in a different format, or extract more content information before it is stored in the local disk. Then, the retrieval of the post-processed data will consume much less bandwidth than the original images.

The command for coordinating the image processing and processing module 14 in the camera can also utilize the iSCSI interface. In this case, the camera image processing unit receives the iSCSI control command and data block, (containing embedded image processing requests to an image processing unit and/or between two or more image processing units). The embedded commands provide a basis for using a single iSCSI storage protocol to resolve all communication needs reliably. In this set up there need not be any other protocol for reliable message delivery through iSCSI between cameras. Each camera is a client, which has intelligence and a server, which provides services to other clients in a distributed manner to form an intelligent peer-to-peer video sense network.

Although the illustrated components represent a presently preferred embodiment, capable of operating in a peer-to-peer distributed video sensor network environment, other embodiments of cameras are also possible within the scope of the invention. For example, if prerecording and image caching capabilities are not required, the image cache and prerecording module 18 may be eliminated. Similarly, while multi-level encoding is presently preferred, a different embodiment might employ only a single encoding capability.

Notably, cameras 10 and 12 employ iSCSI interfaces to allow the cameras to interact directly with iSCSI devices, such as disk drives, media players and media editing applications, and also with each other. Thus in the presently preferred embodiment cameras 10 and 12 include an iSCSI initiator module 22 and an iSCSI target module 24. In this presently preferred embodiment, the cameras are capable of performing both client and server operations in the requesting, transmitting, reading and writing of data under the iSCSI protocol. By having both iSCSI initiator and iSCSI target modules, the cameras are capable of operating in a peer-to-peer network, where the role of any given camera device may change from client to server and back again, depending on the information requirements.

This configuration of providing both iSCSI client and iSCSI server functionality provide advantages for building autonomous image processing functions inside the camera. The intelligent image processing function can access the iSCSI-based system as a virtual storage and can directly write the media stream and metadata (intermediate data that describes the media content) to the conventional disks or semiconductor disks. These said data can be shared among the image processing units as show in FIG. 1. For example, image processing module 14 direct access to block of data mapped into the iSCSI target module 24 of remote camera 10a without requiring replicating multiple copies of image frames or meta data from camera 10a to camera 20a. Such fast data sharing is efficient for image processing applications such as tracking an object in the overlapped region of two cameras and exchange color calibration data between image processing units, etc.

Of course, other embodiments are also possible. Such embodiments may be implemented where a given camera has only an iSCSI initiator module, or only an iSCSI target module. While having only one module and not the other would limit that camera to handling only certain types of operations, there may be systems where such capabilities are sufficient. In general, however, the illustrated embodiment in FIG. 1 is presently preferred. It is envisioned that the cost to deploy both initiator and target on a single camera is not significantly higher than deploying only one of the two.

One of the powerful aspects of the camera system of the invention is the ability of the camera to act autonomously without the need for separate server components to decide how to store information on remote devices such as storage devices attached to a local area network or wide area network (including the internet). To illustrate this capability, storage devices 26 and 28 are made accessible to the cameras by connecting them to the LAN or WAN 30. In this context, the WAN could be the internet or any separate wide area network. By configuring storage devices 26 and 28 as iSCSI target devices, the cameras can perform read and write operations on these devices, using the iSCSI protocol, as if they were embedded in the cameras themselves.

Use of the iSCSI protocol to effect communication between camera and such remote devices offers a number of significant advantages. A few such advantages will be noted here; others will be apparent to those skilled in the art. For one, multiple player or processing devices can connect to the camera, as if connecting to a disk. Multiple applications can then be deployed in remote devices that use the camera (instead of being deployed inside the camera) to reduce the cost of camera hardware and software development. Also, the camera can write to a network-attached disk directly. This can reduce the complexity of the image recorder design and lower recorder cost. The camera can identify multiple iSCSI targets and thus write data concurrently to those multiple targets.

By way of further advantage, remote storage devices can poll prerecorded data from a camera, as if reading from a local disk. This is done by using the camera as a target iSCSI device and then mapping the SCSI disk to the remote storage device. Multiple sessions can each connect to a scalable encoded data stream, such as an MPEG stream, and can be reliably recorded into multiple channels of one iSCSI device. The session can also originate from one initiator of a recording device and be sent to multiple targets in multiple cameras. Playback can then be readily synchronized without additional support, because the multiple channels of the one iSCSI device are naturally organized as time-aligned blocks and are thus naturally synchronized. Moreover, multiple media player areas can be written at the same time by a camera directly, provided that the media player buffer is mapped to the iSCSI target through an iSCSI client interface.

The camera architecture illustrated in FIG. 1 allows the camera to both write to and read from a remote device. The camera can be set up to write to a media player buffer area directly over the IP network. Video frames are mapped onto iSCSI data blocks. This enables a camera to write to and read from a networked device as if the video frames were a sequence of iSCSI data blocks. This capability opens up a wide range of possibilities. The camera can have remote access to a captured file, as if it were a sequence of data blocks. The camera can also write data to a remote archival system or processing device using the iSCSI protocol. Several different possibilities have been illustrated in FIG. 1. Thus, in FIG. 1 cached images developed through prerecording may be sent by camera 12 (block 12a, prerecording module 18) through the iSCSI initiator 22 and over the network 30 to a suitable iSCSI target device 26. Having been stored on the target device, the data may be utilized by a variety of different processing and presentation applications, shown diagrammatically at 40. The iSCSI initiator 42 of the associated processing or presentation application would initiate an iSCSI command to allow it to read media frames from the iSCSI target 26 as if it were a sequence of data blocks.

Illustrating a further example, multi-level encoded data 20 may be sent using the iSCSI initiator 22, over the network 30 to a designated iSCSI target 28. In a similar fashion, processing and presentation applications 40 may access the frame information stored in the iSCSI target 28. As will be more fully explained below, the multi-level encoded data is advantageously mapped onto the iSCSI target using one or more channels of the iSCSI target to store different layers of data corresponding to different multi-level resolutions.

In embodiments where the cameras are also provided with iSCSI target capabilities, such as cameras 10 and 12 in FIG. 1, iSCSI initiators can interact with these targets in essentially the same manner as they would interact with targets 26 and 28. Thus, for illustration purposes, the iSCSI initiator 42 of the processing or presentation application 40 is shown sending a command to the iSCSI target 24 of camera 10 (block 10a). In this way, the processing or presentation application 40 can write to or read from the iSCSI target 24 associated with camera 10.

The cameras are also capable of participating in peer-to-peer communications. This is illustrated in FIG. 1, where the iSCSI initiator 22 of camera 10 is shown sending a command to the iSCSI target 24 of camera 12. In this way, the cameras, when networked together, can pass frame data back and forth among them, as if they were simply reading or writing data blocks to a storage device.

Figure 2:
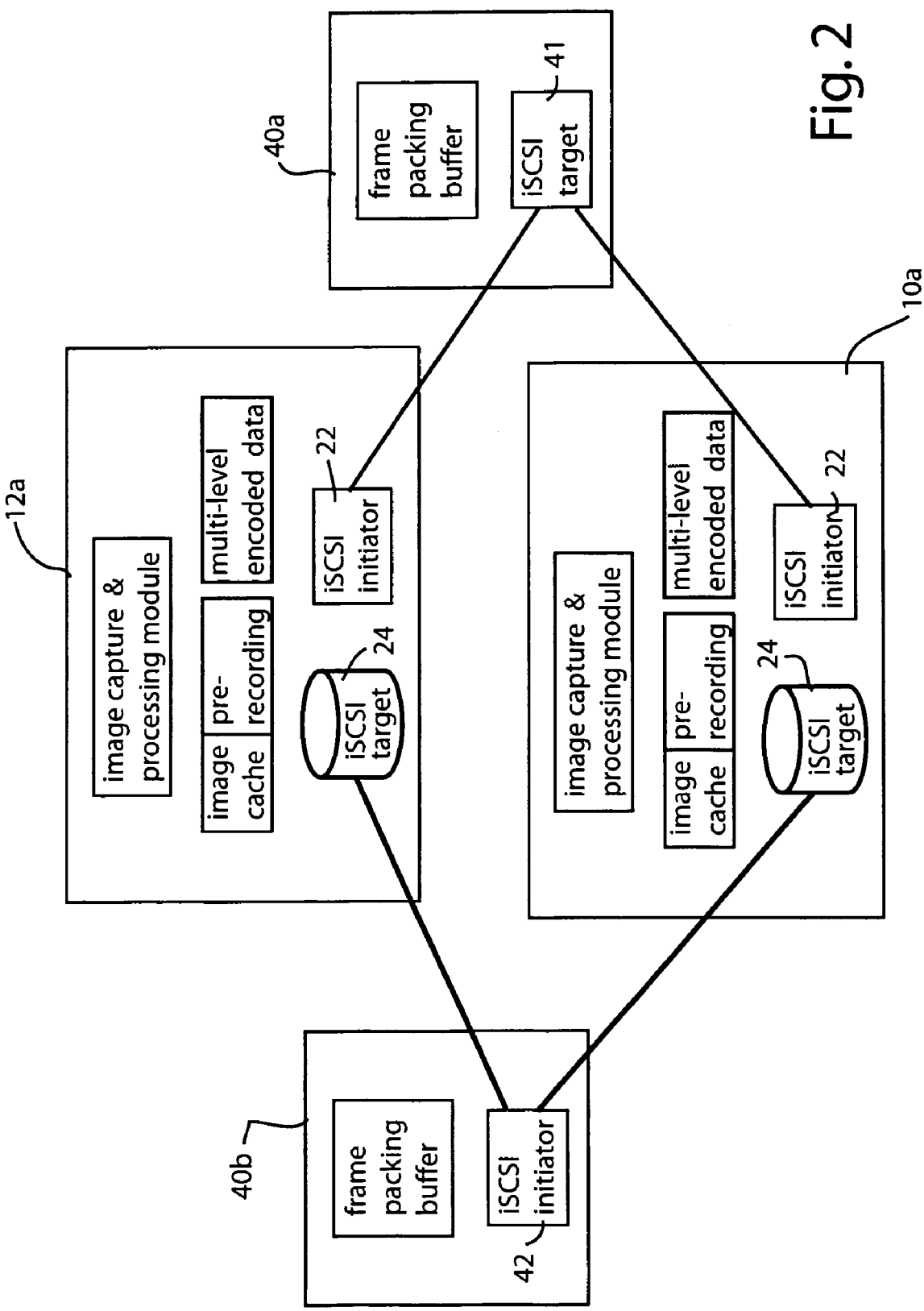
FIG. 2 illustrates a camera network implemented using the iSCSI cameras of the invention.

Exploiting the network capabilities afforded by the presently preferred architecture, a set of cameras can register with a resource manager to form a camera network. Such a network is illustrated in FIG. 2. Referring to FIG. 2, cameras 10a and 12a are shown in an iSCSI enabled camera network where they are configured to communicate, not only between themselves, but with processing or presentation applications 40a and 40b. For illustration purposes, cameras 10a and 12a are shown utilizing their respective iSCSI initiator modules 22 to participate in iSCSI data transfer with the iSCSI target 41 of processing or presentation application 40a. Also illustrated is the iSCSI initiator 42 of processing or presentation application 40b exchanging data with the iSCSI targets 24 of the respective cameras 10a and 12a.

Data from a set of cameras can each form a separate session that can be recorded onto one iSCSI target as one iSCSI channel. In that case, the data is synchronized for read and write operation. This unique feature is simpler than performing correlation between video frames stored in multiple files when displaying the video recorded from multiple camera sources synchronously. It is easier to play, rewind and pause all of the storage video sequences at the frame boundary because the media frames are mapped onto the iSCSI data blocks, thereby allowing the iSCSI data transfer protocol to effect control to stop at a media boundary by simply stopping at a given data block.

Also as illustrated in FIG. 2, iSCSI target software (such as applications 40a and 40b) the cameras can interact with remotely located software. Thus iSCSI target software can support remote access to the locally stored data associated with one or more remote iSCSI initiators. Cameras will register the iSCSI target with an internet storage name service (iSNS) and the initiator and read the camera using the iSCSI interface. Since the iSCSI interface provides direct access to disk sectors in the camera's local storage system, the data stored in the local storage of the cameras can be retrieved simultaneously and synchronized at the data block boundary.

According to a presently preferred embodiment, frame buffers of a media player or other media utilization device are mapped onto iSCSI data blocks, so that the frame buffer can be controlled directly from the camera. Such mapping allows cameras to write data into the display directly, and at the same time write data to the remote disk in a peer-to-peer manner, without the need for a relay server in the middle. Moreover, by being able to read and write directly at the data block level, the camera system does not require a file and directory system as are typically required to manage data files on a computer or computer network. By eliminating the need for a directory system and file system, the processing burden can be greatly reduced thereby improving the responsiveness of the overall system.

Figure 3:
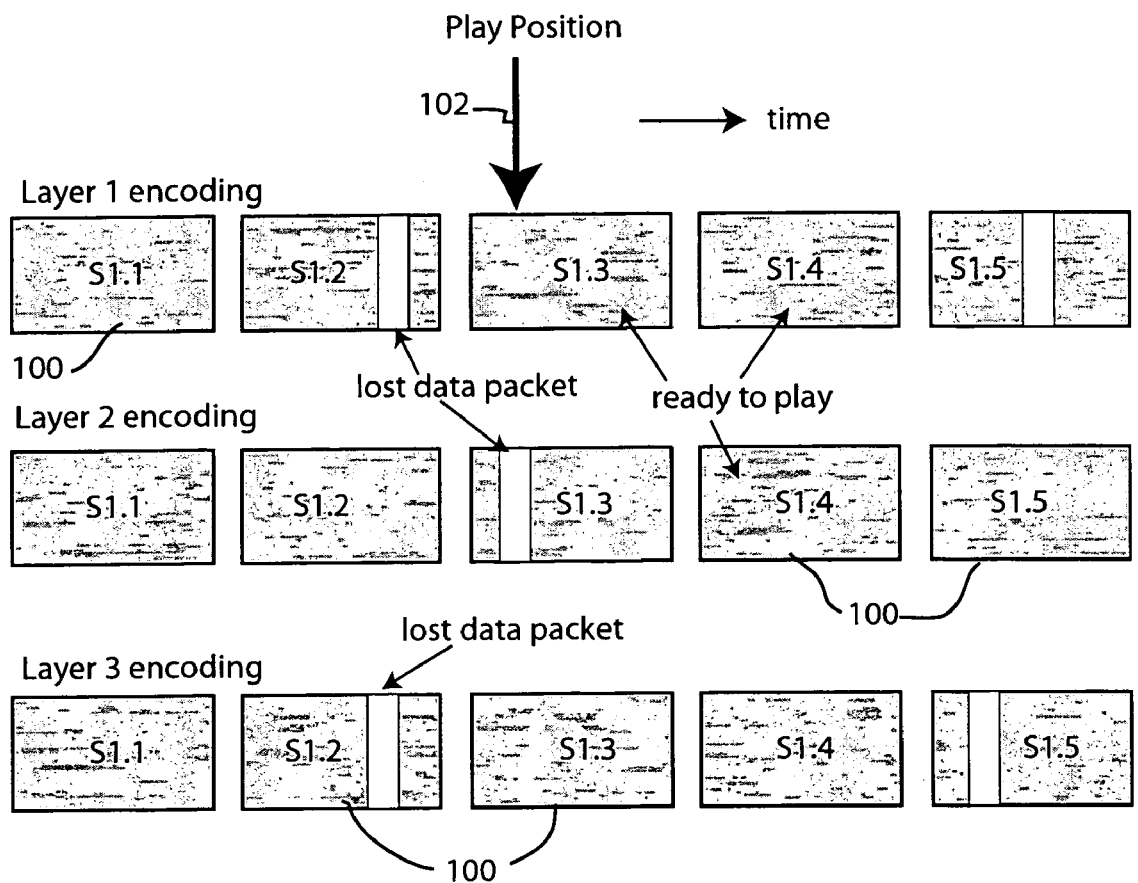
FIG. 3 is a data block diagram illustrating the mapping of video frames onto data blocks and further illustrating how multiple layers may be used to support multi-rate playback or variable-rate playback while accommodating lost data packets.

FIG. 3 illustrates how the presently preferred frame packing protocol provides a mechanism to map the frame buffer into iSCSI data sectors. FIG. 3 illustrates individual iSCSI data blocks 100 onto which video frames (S1.1, S1.2 ... S1.5) are mapped. A play position counter 102 indicates the current data block (media frame) being played, with time proceeding in the right hand direction, as illustrated. Although the system can be used to support a single level media stream, FIG. 3 illustrates how a multi-level (in this case three-level) stream would be handled. Thus FIG. 3 illustrates three separate levels (Level 1, Level 2 and Level 3). Often these separate layers will be used to deliver scalable encoding where each successive layer may contain higher resolution than the previous layer. The media player is configured to play a low resolution part of a progressive encoded image first and then play the next level of resolution as the data packets arrive. The different resolutions are combinable in the media player so that the output can be scaled to provide the desired resolution simply by adding or subtracting layers.

The iSCSI protocol utilized by the presently preferred embodiments provides a significant benefit in automatically handling packet loss. If there is a packet loss, the iSCSI packing protocol will mark the data block (frame) as being incomplete and will then wait for the TCP retransmission. For illustration purposes, several of the data blocks (frames) in FIG. 3 are shown having lost packets. The media player is configured so that it will not display the frame buffer until the frame buffer is marked "ready to play." Because the iSCSI protocol automatically handles the detection and retransmission of lost packets, the camera system and associated media player do not, themselves, have to expend processing resources to deal with lost packets.

In the multi-level embodiment illustrated in FIG. 3, the system can be robustly configured so that play need not stop to wait for lost packets to get retransmitted in all instances. So long as at least one of the layers for each frame has been marked as "ready to play," playback can proceed to next block of data by skipping the block with lost packets. Referring to FIG. 3, the fact that the S1.2 frame in Layer 1 contains a lost data packet does not require playback to stop, because the corresponding frames S2.2 of Layer 2 is intact and "ready to play."

Although playback did not need to stop in the preceding example, the camera system will nevertheless cause the lost data packets to be retransmitted as a natural consequence of utilizing the iSCSI protocol. Thus, the next time the media content is played, all missing data packets may have been retransmitted. Stated differently, the iSCSI camera system of the invention operates automatically, in background, to ensure that all missing packets are retransmitted until all available data has been transferred to the target device. This "self healing" capability of the iSCSI camera system offers significant bandages in mission critical applications. Moreover, because the data transfer can be spread across multiple peer-to-peer devices, a camera network in accordance with the presently preferred embodiment can automatically propagate valuable data to multiple target locations thereby greatly increasing the robustness of the media system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A camera for connection to a network, comprising:
   a camera device for converting optical information into electronic image data;
   a data transfer module coupled to receive said electronic image data from said camera device, said data transfer module being configured to comply with the iSCSI protocol and adapted to communicate said image data over said network as a plurality of iSCSI data blocks, wherein said data transfer module includes an iSCSI target module adapted to communicate with an iSCSI initiator device attached to said network using the iSCSI protocol to communicate control commands to the camera device.

2. The camera of claim 1 wherein said data transfer module includes an iSCSI initiator module adapted to communicate with an iSCSI target device attached to said network using the iSCSI protocol.

3. The camera of claim 1 wherein said camera device defines said electronic image data into a sequence of video frames and wherein said data transfer module is configured to map said video frames onto a sequence of iSCSI data blocks.

4. The camera of claim 1 further comprising image processing module adapted to interact with other cameras over said network to form a peer-to-peer video sensing network.

5. The camera of claim 1 further comprising prerecording module with associated image cache adapted for storing said electronic image data.

6. The camera of claim 1 further comprising image cache adapted for storing electronic image data communicated to said camera using said data transfer module.

7. The camera of claim 1 further comprising multi-level data encoding module adapted to communicate a scalable encoded stream onto multiple iSCSI channels.

8. The camera of claim 7 wherein said encoding module is further adapted to communicate said scalable encoded stream onto multiple iSCSI channels of a single iSCSI target.

9. The camera of claim 8 wherein said stream corresponds to plural sequences of frames associated with different resolutions, each being mapped onto the iSCSI data blocks a different one of said iSCSI channels.

10. A networked camera system comprising:
    a plurality of camera devices each adapted for converting optical information into electronic image data;
    said plurality of camera devices each having a data transfer module coupled to receive said electronic image data, said data transfer module being configured to comply with the iSCSI protocol and adapted to communicate said image data over said network as a plurality of iSCSI data blocks; said plurality of camera devices being coupled for communication with each other over a network by sending iSCSI data blocks to effect communication.

11. The camera system of claim 10 wherein the data transfer module of at least one said plurality of cameras includes an iSCSI initiator module adapted to communicate with an iSCSI target device attached to said network using the iSCSI protocol.

12. The camera system of claim 10 wherein the data transfer module of at least one said plurality of cameras includes an iSCSI target module adapted to communicate with an iSCSI initiator device attached to said network using the iSCSI protocol.

13. The camera system of claim 10 further comprising media utilization system coupled to said network and wherein at least one of said plurality of cameras is adapted to communicate directly with said media utilization system by sending iSCSI data blocks to said media utilization system.

14. The camera system of claims 13 wherein said media utilization system is selected from the group consisting of disk drive, media player, media editing system and combinations thereof.

15. The camera system of claim 10 further comprising plural media utilization systems coupled to said network and wherein at least one of said plurality of cameras is adapted to concurrently communicate directly with said media utilization systems by sending iSCSI data blocks to said media utilization system.

16. The camera system of claim 10 wherein said plurality of camera devices define a peer-to-peer network.

17. The camera system of claim 10 wherein at least one of said plurality of cameras operates as a server and wherein at least another one of said plurality of cameras operates as a client to effect a sharing of electronic image data and or extracted feature data from the processing module among said cameras.

18. The camera system of claim 10 wherein said at least one of said plurality of cameras further comprises an intelligent processing unit that can interact with other cameras to map electronic image data stored on said one camera onto a virtual storage network defined by devices attached to said network so that the cached data can be directly accessed by processing logic from other camera directly without replications.

19. The camera system of claim 18 wherein said virtual storage network is defined at least in part by other cameras having said intelligent processing unit and attached to said network.

20. The camera system of claim 19 wherein the intelligent processing unit can provide additional functions that can be implemented using the virtual storage network.

21. The camera system of claim 19 wherein the intelligent processing unit can also provide coordination functions such as authentication, camera firmware code update and configuration parameter loading directly from the virtual storage network.

22. A camera for connection to a network, comprising:
    a camera device for converting optical information into electronic image data;
    a data transfer module coupled to receive said electronic image data from said camera device, said data transfer module being configured to comply with the ISCSI protocol and adapted to communicate said image data over said network as a plurality of iSCSI data blocks; and
    an image processing module adapted to interact with other camera over said network to form a peer-to-peer video sensing network.

23. The camera of claim 22 wherein said data transfer module includes an iSCSI initiator module adapted to communicate with an iSCSI target device attached to said network using the iSCSI protocol.

24. The camera of claim 22 wherein said data transfer module includes an iSCSI target module adapted to communicate with an iSCSI initiator device attached to said network using the iSCSI protocol.

25. The camera of claim 22 wherein said camera device defines said electronic image data into a sequence of video frames and wherein said data transfer module is configured to map said video frames onto a sequence of iSCSI data blocks.

26. The camera of claim 22 further comprising prerecording module with associated image cache adapted for storing said electronic image data.

27. The camera of claim 22 further comprising image cache adapted for storing electronic image data communicated to said camera using data transfer module.

28. The camera of claim 22 further comprising multi-level data encoding module adapted to communicate a scalable encoded stream onto multiple iSCSI channels.

29. The camera of claim 28 wherein said encoding module is further adapted to communicate said scalable encoded stream onto multiple iSCSI channels of a single iSCSI target.

30. The camera of claim 29 wherein said stream corresponds to plural sequences of frames associated with different resolutions, each being mapped onto the iSCSI data blocks a different one of said iSCSI channels.

31. A camera for connection to a network, comprising:
a camera device for converting optical information into electronic image data;
a data transfer module coupled to receive said electronic image data from said camera device, said data transfer module being configured to comply with the iSCSI protocol and adapted to communicate said image data over said network as a plurality of SCSI data blocks; and
multi-level data encoding module adapted to communicate a scalable encoded stream onto multiple iSCSI channels.

32. The camera of claim 31 wherein said data transfer module includes an iSCSI initiator module adapted to communicate with an iSCSI target device attached to said network using the iSCSI protocol.

33. The camera of claim 31 wherein said data transfer module includes an iSCSI target module adapted to communicate with an iSCSI initiator device attached to said network using the iSCSI protocol.

34. The camera of claim 31 wherein said camera device defines said electronic image data into a sequence of video frames and wherein said data transfer module is configured to map said video frames onto a sequence of iSCSI data blocks.

35. The camera of claim 31 further comprising prerecording module with associated image cache adapted for storing said electronic image data.

36. The camera of claim 31 further comprising image cache adapted for storing electronic image data communicated to said camera using said data transfer module.

37. The camera of claim 31 wherein said encoding module is further adapted to communicate said scalable encoded stream onto multiple iSCSI channels of a single iSCSI target.

38. The camera of claim 37 wherein said stream corresponds to plural sequences of frames associated with different resolutions, each being mapped onto the iSCSI data blocks a different one of said iSCSI channels.

* * * * *